United States Patent [19]
Hall et al.

[11] Patent Number: 5,820,379
[45] Date of Patent: Oct. 13, 1998

[54] COMPUTERIZED METHOD OF DISPLAYING A SELF-READING CHILD'S BOOK

[76] Inventors: Alfred E. Hall, 14943 Hillcrest Rd., Dallas, Tex. 75248; B. Grady Smith, 9827 Walnut St., N. 106, Dallas, Tex. 75243

[21] Appl. No.: 837,131

[22] Filed: Apr. 14, 1997

[51] Int. Cl.$^6$ .................................................. G09B 5/00
[52] U.S. Cl. .......................... 434/178; 434/306; 434/317; 434/178; 434/179
[58] Field of Search ................................. 434/178, 317, 434/179, 308, 309, 322, 335

[56] References Cited

U.S. PATENT DOCUMENTS

| | | |
|---|---|---|
| 4,703,573 | 11/1987 | Montgomery et al. ................. 434/317 |
| 4,855,725 | 8/1989 | Fernandez ................................ 434/317 |
| 5,538,430 | 7/1996 | Smith et al. ............................. 434/178 |
| 5,663,748 | 9/1997 | Huffman et al. ........................ 434/317 |

*Primary Examiner*—Glenn E. Richman
*Attorney, Agent, or Firm*—Jones, Day, Reavis & Pogue

[57] ABSTRACT

A method of displaying a self-reading electronic child's book on a display medium that displays a sequence of indicia, such as words, and having associated with the first indicia or word a visual indicator that may be associated with a cursor moved by a child to audibilize the indicia or word associated with the visual indicator and automatically cause the visual indicator to move under the next indicia or word in sequence to enable a book to be read by a child.

9 Claims, 1 Drawing Sheet

COMPUTERIZED METHOD OF DISPLAYING A SELF-READING CHILD'S BOOK

BACKGROUND OF THE INVENTION

1. Field of the Invention

The present invention relates in general to children's books and in particular to a child's book that can be displayed on a display medium such as a television screen and that is self-reading when a child moves a cursor to a visual indicator associated with each of said words in sequence.

2. Description of Related Art Including Information Disclosed Under 37 CFR 1.97 and 1.98

There are many different types of electronic books and cards existing in the marketplace today. In commonly owned U.S. Pat. No. 5,538,430 entitled "Self-Reading Child's Book" and issued Jul. 23, 1996, and incorporated herein by reference in its entirety, there has been disclosed a child's book that has at least one book page having a plurality of sequentially associated indicia thereon with a light or other visual indicator associated with each of the indicia such that the visual indicators are sequentially energized by the child touching the area adjacent the visual indicator and causing the corresponding sound from a speech synthesizer that is an audible representation of that indicia. Thus the book will make an audible representation of each indicia in sequence as the child touches a visual indicator associated with the indicia.

It would be advantageous to have a child's book stored on an electronic storage medium such that it could be displayed on a display medium such as a television screen or personal computer display screen with the sequential words forming the story and with a visual indicator under at least the first word in the sequence of printed words on the display medium such that a child could cause the book to be self-reading simply by moving a cursor or other device in association with a visual indicator associated with each word in the sequence to activate a speech synthesizer to audibly state the word.

SUMMARY OF THE INVENTION

In the present invention, the sequential words of at least one child's book is stored on a data storage medium such as a CD-Rom in the form of a floppy disk or the like for use with a PC or a cartridge-type storage medium that is inserted in a slot in a control device. Also, an input from a telephone line or cable coaxial line into a modem, which could be part of the PC or the cable head end, could be used to supply the data forming the child's book. Such control device is coupled to the television set thus providing a display output including sequential words and having associated audible representations stored on the cartridge-type storage medium. When the child moves a cursor (such as with buttons, levers, mouse, or other control device) relative to the visual indicator, an audible representation of that word is sounded. A software program causes the visual indicator to be automatically and sequentially moved from one word to the next beginning with the first word in the story as each word is audibilized by movement of the cursor until all of the words of the child's book are read.

In the preferred embodiment, a plurality of children's books are stored on one storage medium such that the first representation on the display screen is a cover sheet of each of the child's books stored on the storage medium so that the child can select a desired book with a cursor in the conventional manner.

A PC computer can be used with the sequential words and associated audible representations of each word being stored on a CD-Rom such as a floppy disk with the necessary control program. The PC display screen can be used as the display medium and a mouse can control the cursor as is well known in the art to generate signals for moving the cursor relative to the visual indicator and cause the audible representation of the word associated with the visual indicator.

Again, the data representing the sequential words and associated audible representations of each word and the software program can be downloaded from a remote source over telephone lines.

Thus, it is an object of the present invention to provide a computerized display of a self-reading child's book.

It is another object of the present invention to provide a display of a self-reading child's book on a conventional television set through a cartridge device storing the program and indicia, such as words, in combination with the associated speech synthesizer data.

It is yet another object of the present invention to provide a display of a self-reading child's book on a PC (personal computer) with the pertinent program and data stored on a CD-ROM.

It is still another object of the present invention to provide a display of a self-reading child's book on a PC with the pertinent program and data being transferred to the PC via telephone lines.

Thus the present invention relates to a method of displaying a child's book for self-reading by a child comprising the steps of storing the sequential words of at least one child's book on a data storage medium, storing an associated audible representation of each of said words on said data storage medium, displaying the stored words on a display medium, displaying a visual indicator under at least the first word in the sequence of the printed words on the display medium, moving a cursor on the screen relative to the visual indicator to cause the audible representation of the word associated therewith to be audibilized, and automatically and sequentially moving the visual indicator from one word to the next beginning with the first word as each word is audibilized by movement of the cursor until the words of the child's book are read.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which.

DETAILED DESCRIPTION OF THE PREFERRED EMBODIMENT(S)

Figure 1:
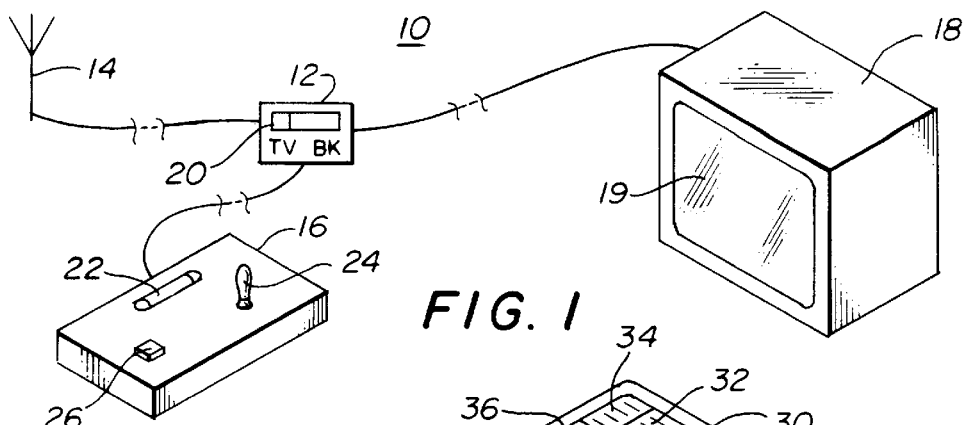
FIG. 1 is a schematic representation of one apparatus used in performing the method of the present invention including a television set, a Nintindo®-type control device coupled to a selector switch that enables either the normal television signals to be displayed or the output signals of the control device representing the child's book to be displayed.

One embodiment of the apparatus for use in performing the method of the present invention is illustrated in FIG. 1. The system 10 includes a switch 12 that selectively couples an antenna 14 or a control device 16 to a television set 18. Such system is, of course, well known in the art and includes a display screen 19 on which visual representations are illustrated. The switch 12 has a device 20 that can be used to connect the television set 18 either to the antenna 14 or to the control device 16 containing the child's book.

Figure 2:
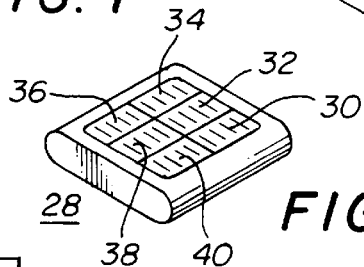
FIG. 2 illustrates a cartridge-type storage medium for insertion in a slot in the control device of FIG. 1 containing data and a program that causes the words of at least one child's book to be displayed on the television screen when the control device is coupled thereto.

The control device 16 operates in a manner similar to Nintindo®-type devices, well known in the art and will not be described in detail. Suffice it to say that a cartridge, as shown in FIG. 2 containing a program for generating at least one but preferably a plurality of child's books from data stored therein preferably in the form of digital data, can be inserted in slot 22 and, when the control device 16 is turned ON, the television set 18 will display on its screen 19 a format such as that shown in FIG. 3 if data representing a plurality of books is stored on the cartridge-type storage device. By maneuvering a cursor 44 on the screen (see FIG. 3) with cursor control lever 24, a particular book to be read can be selected and then switch 26 activated to select that book. Clearly, to create a program for forming a display screen such as shown in FIG. 3 and FIG. 4 is within the purview of one skilled in the art and will not be set forth here in detail.

The cartridge-type storage medium 28 shown in FIG. 2 may have a plurality of pictures 30, 32, 34, 36, 38, and 40 on the face thereof to enable the user to identify the particular books that are electronically stored in the cartridge 28. The pictures, of course, may be well-known representations of children's stories that a child would recognize.

Figure 3:
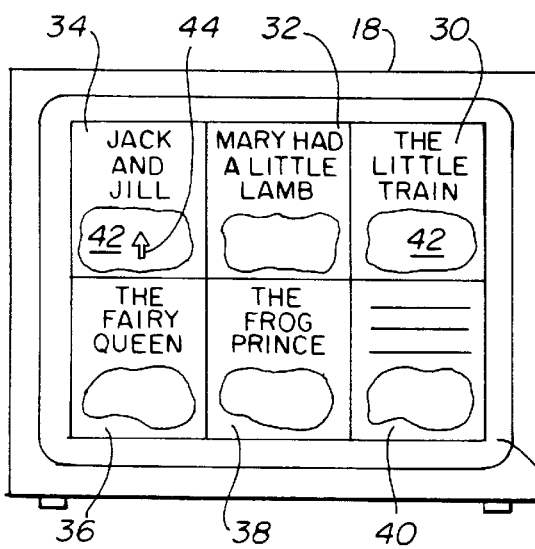
FIG. 3 is a plan view of a display screen illustrating one version of the invention in which a plurality of covers of stored children's books appear on the display screen for selection by a child.

When the cartridge 28 of FIG. 2 is inserted in slot 22 of the control device 16 and the control device turned ON, and when the selector switch 12 is set to have the television set 18 coupled to the control device 16, there will appear on the screen 19 of the television set 18 the format illustrated in FIG. 3. There are shown the cover or title pages of the six books 30, 32, 34, 36, 38, and 40. Of course, only one book could be stored in a cartridge 28, if desired. Associated with each of the titles may be a space 42 which has pictures that a child could recognize to identify the book. Such figures could include cartoon characters, Cinderella, Snow White, and the like. The child can then move cursor control 24 on control unit 16 shown in FIG. 1 until the cursor 44 shown in FIG. 3 is on any particular square representing a particular book. For instance, if the cursor 44 shown in FIG. 3 were left in its position as shown, then the book "Jack and Jill" would appear on the display screen. If the cursor were moved to block 32, "Mary Had a Little Lamb" and activated such as by pressing switch 26 in FIG. 1, then the screen shown in FIG. 4 would appear.

Figure 4:
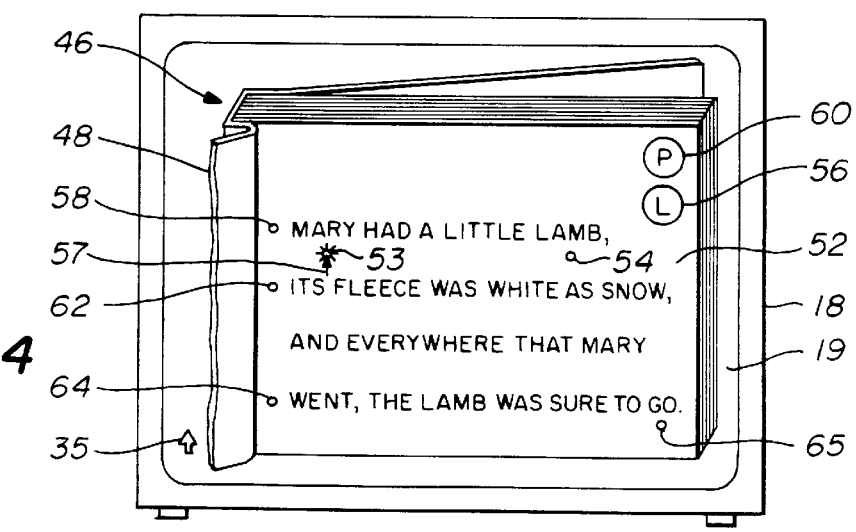
FIG. 4 illustrates a page of a particular book selected by the child as it appears on the display after selection.

As shown in FIG. 4, the book 46 is represented by a plurality of pages 48 and 50, only part of page 48 being shown. However, it is to be understood that only one page may be shown by itself. The book 46 has thereon lines of words 52 that are sequentially ordered. Thus, for example, line 52 reads "Mary had a little lamb" and associated with the first word is a visual indicator 53. The visual indicia could include an indicator such as 54 and 60 under every word on the page with only the first one having some peculiar indication such as flashing, blinking, or the like to attract a child's attention. In the preferred embodiment, only one visual indicator 53 appears under the first word as shown. In this case, it is under the word "Mary". A cursor 55 is shown on the screen 19 and may be moved by the child by means of control 24 (in FIG. 1) or a mouse (in FIG. 5), in the event of use with a PC. If it is moved to position 57 contacting the visual indicator 53 as shown and a switch, such as a mouse switch, is depressed or activated, the stored program causes the word "Mary" to be audibilized. The indicia 53 then automatically disappears under the word "Mary" and is moved by the program under the word "had". The child then moves the cursor 55 to the visual indicator now under "had", presses the switch, and that word is audibilized. The sequence continues until the end of the line where the visual indicator 54 appears under the word "lamb". By associating the cursor 57 with visual indicator 54, the word "lamb" is audibilized. In this manner the entire book may be read down to the last word "go" on that page where the visual indicator 60 appears. The program, of course, could cause the word to be audibilized just by moving the cursor in contact with, or in some predetermined relationship to, the visual indicator. The purpose of the visual indicator is to cause the child to look at the word being audibilized. Instead of having the visual indicator under a word, the entire word could be caused to blink and thus be the visual indicator associated with each word.

As each word is identified by the visual indicator 53, and the cursor 57 is associated with the indicator as shown, the word is audibilized. Thus, the child is looking at the word at the time it is audibilized enabling a visual recognition of the word as it is sounded.

Once a child has learned how to read the words somewhat, if desired, the child may move the cursor 55 to contact visual indicator 56 designated by the letter "L" and thus indicating "line". In this case, the visual indicator 58 at the beginning of the line "Mary had a little lamb" is activated in some fashion to attract the child's attention. Again, it may be a flashing indicator or the like. By moving the cursor 55 to associate with visual indicator 58, an entire line is read, "Mary had a little lamb." Then the visual indicator 58 disappears and appears at 62 at the beginning of the second line. The child may move the cursor 55 to associate with visual indicator 62 and the second line is read. This may be continued through the last line where the visual indicator 64 appears and the cursor 55 may be associated with it and the last line, "lamb was sure to go" is audibilized. This procedure is followed in sequence such that the child, simply by placing the cursor in association with the visual indicator at the beginning of each line in sequence, can read the page a line-at-a-time.

The same format may be used with the visual indicator 60 having a "P" therein to indicate page. If the child associates the cursor 55 with the visual indicator 60, the entire page is read.

Of course, this same operation can be applied to any type of sequential indicia such as the alphabet, A–Z, or the notes of a musical scale.

In this manner the child moves the cursor to the visual indicator associated with each word or indicia and that word or indicia is sounded and then the visual indicator automatically moves to the next sequential indicia where the same process can be repeated. This allows the child to associate the sound with the particular word thus enabling much faster learning of how to read, or identify letters of the alphabet, or musical notes, and the like.

As stated earlier, the visual indicator 53 may be of any well-known type to attract a child's attention. If the monitor is in color, it could be a particular color word. If the monitor is black and while, it could be a flashing dot or other symbol associated with a word. If only one visual indicator is to be used, it could simply be a circle, square, or any other geometric shape desired or the word itself could flash or otherwise be made prominent. It is understood, however, that that indicia, whatever chosen, will automatically move in sequence from each word to the next as a word is sounded.

Figure 5:
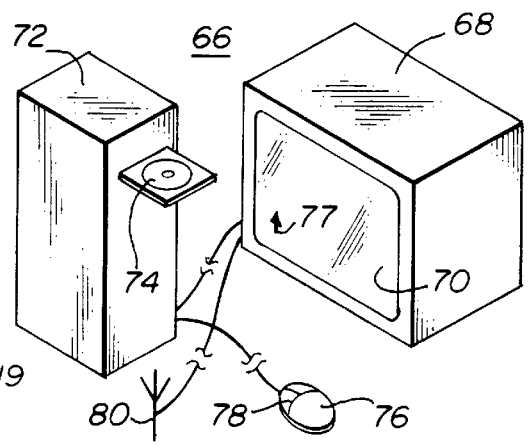
FIG. 5 is a schematic representation of a PC system utilizing a CD-Rom as the storage medium and a mouse for controlling the cursor position and also illustrating a telephone line coupled to the PC for providing data to the PC for display of a self-reading child's book.

If desired, the present system can be used with a personal computer (PC) as illustrated in FIG. 5. The system 66 shown in FIG. 5 includes the computer 68 having a display screen 70 and connected thereto is a hard drive 72 that can take a computer disk 74 and download the contents thereof to the personal computer 68. A mouse 76 can be used to control movement of a cursor 77 on the screen 70. A mouse key 78 may be used to activate the sounding of a word when the cursor 77 is associated with the visual indicator such as indicator 53 in FIG. 4. In addition, a telephone line or coaxial cable 80 may be connected to a remote source, not shown, that transmits the programmed data to the PC when it is accessed in the normal fashion and the book read as previously described.

Thus there has been disclosed a novel method of displaying a self-reading child's book on a television or personal computer display screen and providing visual indicators associated sequentially with each word beginning with the first word such that the child can position a cursor so as to be associated with the visual indicator representing the first word, cause the first word to be sounded, and the visual indicator automatically moved sequentially from one word to the next and the process repeated so that the book can be read. The system can be used with any computer and display screen including personal computers and associated CD-ROM's or typical television sets using a Nintindo®-type control unit having an insertable cartridge-type storage medium that contains the data representing the books. In addition, the data may be received over a telephone line in a manner well known in the art.

Clearly, with such a system, a computer program could be developed to highlight any indicia on a display screen in any order desired such that the child could be prompted to activate the highlighted indicia to have a predetermined message read to the child.

The novel method of the present invention is intended to teach a child about any group of elements, words, places, or things displayed on a display medium so long as they are done in sequence with the primary purpose of teaching the child to learn to read by visually selecting a given word and listening to the pronunciation of the word selected.

The corresponding structures, materials, acts, and equivalents of all means or step plus finction elements in the claims below are intended to include any structure, material, or act for performing the function in combination with other claimed elements as specifically claimed.

What is claimed is:

1. A method of displaying a child's book for self-reading by a child comprising the steps of:

receiving data that represents both the sequential words of at least one child's book and an associated audible representation of each of said words;

displaying said sequential words on a display screen;

displaying a visual indicator associated with said first word in said sequence of printed words on said display screen;

moving a cursor on said display screen relative to said visual indicator with a cursor control device to cause said audible representation of said word to be audibilized; and providing a stored program for automatically and sequentially moving said visual indicator from one word to the next, beginning with said first word, as each word is audibilized by movement of said cursor until the desired words of said child's book are read.

2. The method of claim 1 further comprising the steps of:

storing said data representing both said sequential words and said associated audible representations of each word on a CD-ROM for transmission to a personal computer system; and storing a program in association with said personal computer system for enabling said words and associated audible representation to be sequentially selected for audibilization.

3. The method of claim 1 further including the steps of:

storing said data representing both said sequential words and associated audible representations of a plurality of children's books and a corresponding program on a single storage medium; and selecting data representing any one of said children's books for display on said display screen.

4. The method of claim 1 further including the step of providing a television set with said display screen said television set having a normal television signal input and an optional input for receiving said data representing both said sequential words and associated audible representations.

5. The method of claim 4 further including the steps of:

storing data representing said sequential words and associated audible representations of said words on a cartridge-type storage medium;

electrically connecting said cartridge-type storage medium to a control device;

providing a data output from the control device representing both said sequential words and associated audible representations stored on said cartridge-type storage medium in accordance with a stored program;

coupling a selector switch between said television set, said normal TV input signal, and said control device for enabling either said control device output as said optional TV input or said normal TV signal to be coupled to said television set such that when said selector switch couples said control device output to said television set, said sequentially ordered words and associated visual indicator appear on said television display screen under the control of said stored program; and providing user controls on said control device to move said cursor relative to said visual indicator to cause said audible representation of said word associated with said visual indicator.

6. The method of claim 5 further including the step of storing both the sequential words and associated audible representations of a plurality of children's books on a single cartridge-type storage medium.

7. A method of displaying a book for self-reading comprising the steps of:

receiving data, with a computer system, that represents both the sequential words of at least one book and an associated audible representation of each of said words;

displaying said sequential words on a display screen forming part of said computer system;

displaying a visual indicator associated with said first word in said sequence of printed words on said display screen;

moving a cursor on said screen relative to said visual indicator with a cursor control device to cause said audible representation of said word to be audibilized; and providing a stored program for automatically and sequentially moving said visual indicator from one word to the next, beginning with said first word, as each word is audibilized, by movement of said cursor until the words of said book are read.

8. A method of displaying a book for self-reading comprising the steps of:

storing data representing sequential words and associated audible representations of said words on a cartridge-type storage medium;

electrically connecting said cartridge-type storage medium to a control device;

providing output data from the control device as an optional signal representing both said sequential words and associated audible representations stored on said cartridge-type storage medium;

providing a television set with a display screen, said television set having a normal TV signal input;

coupling a selector switch between said television set, said normal TV signal input, and said control device for enabling either said control device output data optional signal or said normal TV signal input to be coupled to said television set such that when said selector switch couples said control device output data optional signal to said television set, said sequentially ordered words and associated visual indicator appear on said television display screen under the control of said stored program;

providing user controls on said control device to move said cursor relative to said visual indicator to cause said audible representation of said word associated with said visual indicator; and providing a stored program for automatically and sequentially moving said visual indicator from one word to the next, beginning with said first word, as each word is audibilized by movement of said cursor, for reading the words of said book.

9. The method of claim 1 further including the step of receiving said data from a remote source over a transmission path.

* * * * *

(12) EX PARTE REEXAMINATION CERTIFICATE (5843rd)
United States Patent
Hall et al.

(10) Number: US 5,820,379 C1
(45) Certificate Issued: Aug. 7, 2007

(54) COMPUTERIZED METHOD OF DISPLAYING A SELF-READING CHILD'S BOOK

(76) Inventors: Alfred E. Hall, 14943 Hillcrest Rd., Dallas, TX (US) 75248; B. Grady Smith, 9827 Walnut St., N. 106, Dallas, TX (US) 75243

Reexamination Request:
No. 90/007,866, Dec. 29, 2005

Reexamination Certificate for:
Patent No.: 5,820,379
Issued: Oct. 13, 1998
Appl. No.: 08/837,131
Filed: Apr. 14, 1997

(51) Int. Cl.
*G09B 5/00* (2006.01)

(52) U.S. Cl. .................. 434/178; 434/317; 434/179; 434/308

(58) Field of Classification Search .............. None
See application file for complete search history.

(56) References Cited

U.S. PATENT DOCUMENTS

| | | |
|---|---|---|
| 4,406,626 A | 9/1983 | Anderson et al. |
| 4,579,533 A | 4/1986 | Anderson et al. |
| 4,968,257 A | 11/1990 | Yalen |
| 5,010,495 A | 4/1991 | Willetts |
| 5,273,433 A | 12/1993 | Kaminski et al. |

*Primary Examiner*—Bibhu Mohanty

(57) ABSTRACT

A method of displaying a self-reading electronic child's book on a display medium that displays a sequence of indicia, such as words, and having associated with the first indicia or word a visual indicator that may be associated with a cursor moved by a child to audibilize the indicia or word associated with the visual indicator and automatically cause the visual indicator to move under the next indicia or word in sequence to enable a book to be read by a child.

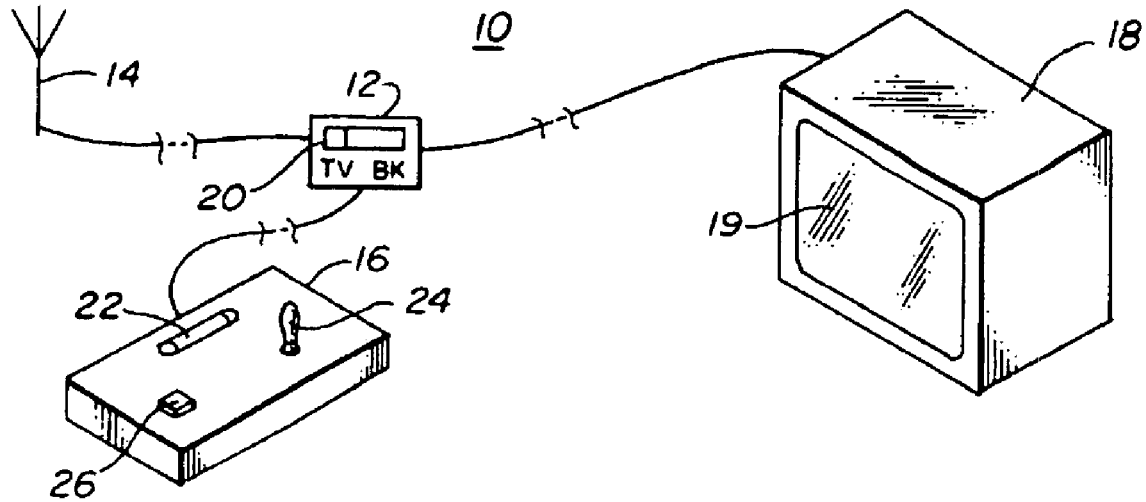

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *